Figure 1:
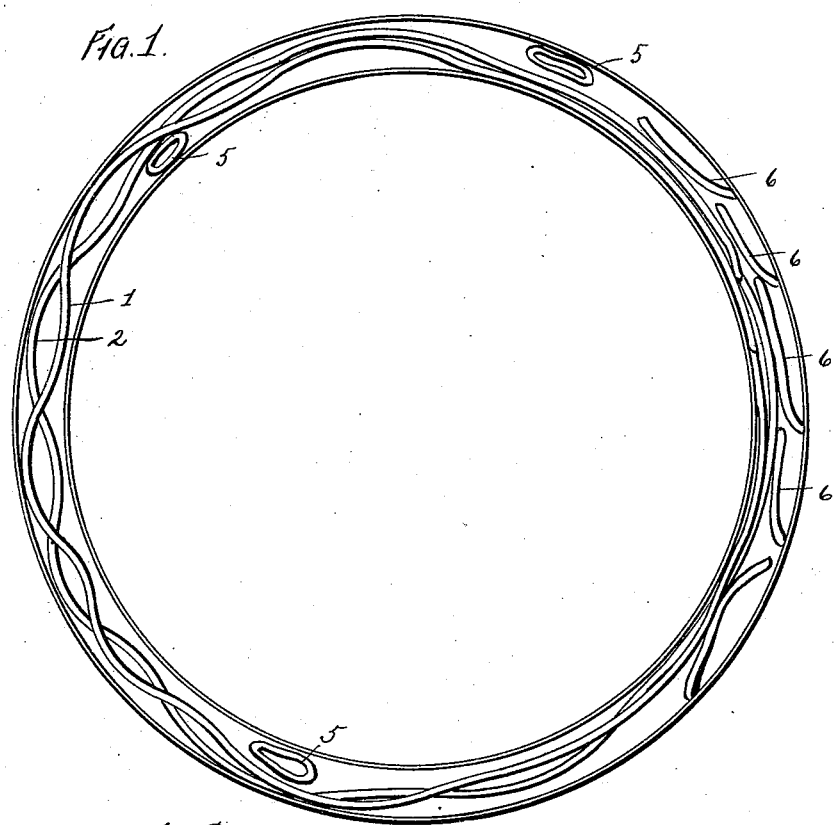

(No Model.)

J. & E. P. FORBES.
TIRE FOR BICYCLES.

No. 547,752. Patented Oct. 8, 1895.

WITNESSES
Geo. M. Anderson
George H. Parmelee

INVENTORS
John Forbes
E. P. Forbes
by E. W. Anderson
their Attorney

ANDREW B. GRAHAM, PHOTO-LITHO. WASHINGTON, D.C.

UNITED STATES PATENT OFFICE.

JOHN FORBES AND EDWARD P. FORBES, OF HALIFAX, CANADA.

TIRE FOR BICYCLES.

SPECIFICATION forming part of Letters Patent No. 547,752, dated October 8, 1895.

Application filed April 8, 1895. Serial No. 544,982. (No model.)

*To all whom it may concern:*

Be it known that we, JOHN FORBES and EDWARD P. FORBES, manufacturers, subjects of the Queen of Great Britain, residing at Halifax, in the county of Halifax, Province of Nova Scotia, Canada, have invented Improvements in Pneumatic Tires for the Wheels of Bicycles and other Vehicles, of which the following is a specification.

Our invention relates to an improved means of repairing punctures in that class of pneumatic tires which are composed of a single tube into which the air for distending the same is forced through a suitably-arranged valve by means of an air-pump adapted for the purpose. The methods heretofore employed in repairing punctures in this class of tires have been by covering the puncture on the outside of the tire, cementing thereon and over the puncture a piece of rubber or suitable fabric, also by pushing through the puncture from the outside a patch of suitable material and shape having a stem attached thereto for the purpose of drawing it up against the inside surface of the tire, said patch being smeared over with cement to enable it to attach itself firmly against the inner surface. Still another method has been by inserting in the puncture from the outside one or more pieces of rubber or other suitable material of sufficient sectional area to enable it or them to completely fill the hole, the material thus introduced and the edges of the hole having been previously coated with cement to secure the plugging in position and to assist in making the same air-tight. Still another method has been to provide within the tire patch-strips adapted to be secured over the puncture at the inside. The objection to these methods is that they are troublesome and tedious and difficult to effect their proper application in the dark and under other unfavorable conditions.

Our improvement consists in providing in the interior of the tire a supply of puncture-repair material adapted to be withdrawn by a properly-devised instrument into the puncture from within outward, the completion of the repair being then effected by applying in the usual manner a portion of cement to unite the edges of the puncture or hole with the portion of internal repair material which has been withdrawn into the hole from the internal supply. It is obvious that said puncture-repair material may be formed of a variety of shapes and of various sectional areas. It may thus consist of flat or of round continuous bands or of filaments depending from the interior surface or of loose rings, or it may consist of material in a more fibrous condition, suitably disposed in the interior and adapted to be withdrawn into the puncture, as before explained.

Figure 2:
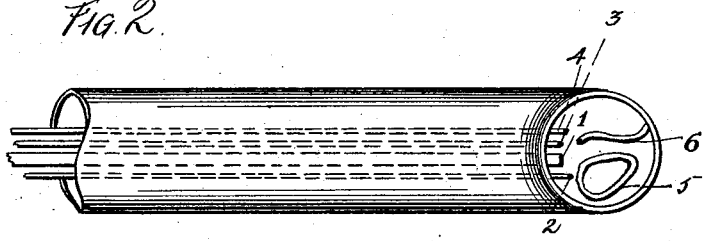
Figure 3:
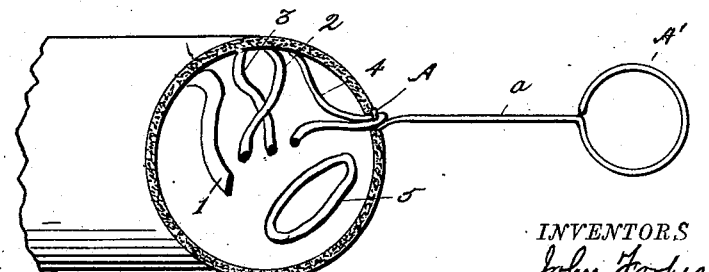

In the drawings accompanying this specification, Figure 1 shows a pneumatic tire in section midway through the plane of the tire. Fig. 2 is a sectional elevation in full size of a small part of a tire. Fig. 3 is a view showing a suitable tool for withdrawing the repair material into a puncture and illustrating the use of the same.

The same numerals refer to like parts in the several figures.

1 2 3 4 show continuous bands, 1 being of a flat section and 2 3 4 being of round section. 5 5 show loose rings introduced in the interior of tire, as previously described.

6 6 6 6 show filaments or strings of rubber attached by one end to the interior surface, as before described. It is apparent that one or more of these bands, rings, or filaments may be engaged by a suitable instrument and withdrawn into the puncture from within outward, as already described.

While any suitable instrument may be employed for withdrawing the repair material outward into the puncture, that shown in Fig. 3 is well adapted for the purpose. It consists of a tapered shank A, having at its smaller end a hook $a$ and at its outer end a handle portion or ring A'.

Having now fully described our invention, what we claim as new, and desire to secure by Letters Patent, is—

A pneumatic tire for vehicle wheels having disposed within its interior repair material in the form of slender strips, filaments rings or the like, of such cross section that it is adapted to be drawn outward into a puncture of the tire, substantially as specified.

JOHN FORBES.
E. P. FORBES.

Witnesses:
W. J. FORBES,
CHAS. S. GARROWAY.